(12) United States Patent
Choi et al.

(10) Patent No.: US 7,298,933 B2
(45) Date of Patent: Nov. 20, 2007

(54) OPTICAL MODULE

(75) Inventors: Kwang Seong Choi, Seoul (KR); Jong Hyun Lee, Daejeon (KR); Yong Duck Chung, Daejeon (KR); Young Shik Kang, Daejeon (KR); Jong Tae Moon, Daejeon (KR); Je Ha Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 225 days.

(21) Appl. No.: 11/148,906

(22) Filed: Jun. 9, 2005

(65) Prior Publication Data

US 2006/0115197 A1    Jun. 1, 2006

(30) Foreign Application Priority Data

Nov. 30, 2004   (KR) ................. 10-2004-0099479

(51) Int. Cl.
G02F 1/01 (2006.01)
G02F 1/35 (2006.01)

(52) U.S. Cl. .................. 385/1; 385/2; 385/8; 385/129

(58) Field of Classification Search ............. 385/1
See application file for complete search history.

(56) References Cited

U.S. PATENT DOCUMENTS 6,101,295 A    8/2000   Mineo et al.
6,323,986 B1 *  11/2001  Lee et al. ................. 359/248
6,677,830 B2    1/2004   Miller, Jr. et al.
7,023,599 B2 *  4/2006   Kato ...................... 359/237

OTHER PUBLICATIONS

Ultra Wide-Band Electroabsorption Modulator Modules For DC To Millimeter-Wave Band, Mineo et al. 2001 IEEE (Institute of Electrical and Electronics Engineers) M-2.4, pp. 9-12.

* cited by examiner

*Primary Examiner*—Frank G. Font
*Assistant Examiner*—Mary El-Shammaa
(74) *Attorney, Agent, or Firm*—Ladas & Parry LLP

(57) ABSTRACT

Provided is an optical module including a microstrip line, a traveling wave type optical device positioned in the end of the microstrip line, and at least one balanced open stub connected to the microstrip line for the impedance matching at a specific frequency such as 40 GHz and 60 GHz. For the fine tuning, laser trimming can be applied to the stub. A transition region is formed between the optical device and the microstrip line. A termination resistor is formed to face the microstrip line with the optical device therebetween. A bandwidth can be controlled at a specific frequency by adjusting a number of the stubs or a value of the termination resistor.

12 Claims, 3 Drawing Sheets

OPTICAL MODULE

CROSS-REFERENCE TO RELATED APPLICATION

This application claims priority to and the benefit of Korean Patent Application No. 2004-99479, filed Nov. 30, 2004, the disclosure of which is incorporated herein by reference in its entirety.

BACKGROUND

1. Field of the Invention

The present invention relates to an optical module, and more particularly, to an optical module using a matching circuit which includes a double stub or a double balanced open stub, a grounded waveguide, a microstrip line transition region and a microstrip line.

2. Discussion of Related Art

Recently, with the development of wireless communications, technologies for transmitting broadband signals to subscribers have been developed. A radio over fiber (ROF) technology for transmitting RF signals through a fiber has been popularly used as a method for transmitting various data from a base station to subscribers without loss.

Researches have been made on impedance matching of an optical modulator module, a laser diode module and an optical receiver module used for an ROF link for minimizing loss of RF signals by transmitting the signals through an optical fiber. Generally, a lumped type device has been used for impedance matching. However, since a maximum frequency is restricted by an RC time constant by a capacitance of the device and a load resistance, the device has difficulty in processing high speed electric signals of 40 GHz and 60 GHz. In addition, a bandwidth is fixed in a specific frequency and not efficiently controlled.

One example of the impedance matching structure of the lumped type optical device has been disclosed under U.S. Pat. No. 6,101,295. A conventional lumped type optical module will now be explained.

FIG. 1 is a schematic plan view illustrating an optical module having an impedance matching structure for the conventional lumped type optical device.

Referring to FIG. 1, a device 1 and a signal line 5 of a microstrip line of a dielectric substrate 3 on which an impedance matching circuit is formed are coupled to each other by using a gold wire or gold ribbon 4. Impedance matching is performed through double open stub 2 formed in the orthogonal direction to the series microstrip line 5. In the case that impedance matching is not accurately performed through the open stubs 2, one or both of the two stubs 2 are trimmed in the width or length direction, so that impedance matching can be performed in a target frequency to obtain a maximum return loss.

However, the aforementioned method is used for the lumped type device whose substrate is an n-type substrate and electrode is formed on a metal on a p-type semiconductor formed on the top surface. In the lumped type device, a capacitance and a load resistance are combined, to cause frequency restrictions by an RC time constant. Therefore, the lumped type device cannot be efficiently applied to high frequency such as 40 GHz, 60 GHz Moreover, since the open stubs 2 for impedance matching are formed in one direction of the microstrip line 5, a spurious mode may occur by interactions between the microstrip line 5 and the open stubs 2.

Devices used for a high speed optical module are classified into a lumped type device and a traveling wave type device. The traveling wave type device can efficiently process 40 GHz and 60 GHz of high speed electric signals. That is, the traveling wave type device prevents frequency restrictions caused by a capacitance with evenly distributing the capacitance. Conversely, a capacitance of the lumped type device is concentrated and coupled to a load resistance, which results in frequency restrictions by the RC time constant. Accordingly, the lumped type device is not appropriate to process high speed signals.

When the impedance is matched for the optical device at a specific frequency, a bandwidth may need to be adjusted so that the signals with different bandwidth which is specified by channel environment, numbers of subscribers, kind of data and so on, can be transferred to subscribers. When the conventional lumped type device is used, an open type termination resistance is applied. Therefore, a bandwidth can be adjusted only by using a few open stubs and the variations are limited.

SUMMARY OF THE INVENTION

The present invention is directed to maximization of gains of an ROF link and easy control of a bandwidth for obtaining a bandwidth required in a specific frequency, by maximizing a return loss of a high speed optical module on which a traveling wave type optical device is mounted.

One aspect of the present invention is to provide an optical module, including: a microstrip line; a traveling wave type optical device positioned in the end of the microstrip line; and at least one stub coupled to the microstrip line, wherein a transition region including the microstrip line and a coplanar waveguide is formed to be coupled to the optical device, and a termination resistor is formed to face the microstrip line with the optical device therebetween.

The optical device is an optical modulator, a laser diode or a photodiode. The optical modulator has a waveguide structure in which a passive optical waveguide, an active optical waveguide and a passive optical waveguide are sequentially formed. Preferably, in the optical module including the traveling wave type optical device, the stub crosses the microstrip line in the orthogonal direction and is protruded from at least one surface of the microstrip line. Two or more stubs can be formed in parallel. The stub can be a balanced open stub. The width of the microstrip line decreases in the transition region. The stub is formed in a rectangular flat plate shape. An orthogonal-transition structure (mitred) can be formed at both ends of the stub in parallel to the proceeding direction of a RF signal through the microstrip line if the stub length is larger than the width of the substrate. At least partial area of the vertically-transited structure is trimmed to maintain a predetermined capacitance. The optical device is interconnected to the transition region and the impedance matching circuit through a gold wire or ribbon. The termination resistance is a thin film resistor. A bandwidth of a predetermined frequency is controlled by adjusting a resistance value of the termination resistor. A bandwidth of a predetermined frequency is also controlled by adjusting a number of the stubs.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF PREFERRED EMBODIMENTS

Hereinafter, an exemplary embodiment of the present invention will be described in detail. However, the present invention is not limited to the embodiments disclosed below, but can be implemented in various types. Therefore, the present embodiment is provided for complete disclosure of the present invention and to fully inform the scope of the present invention to those ordinarily skilled in the art.

Figure 1:
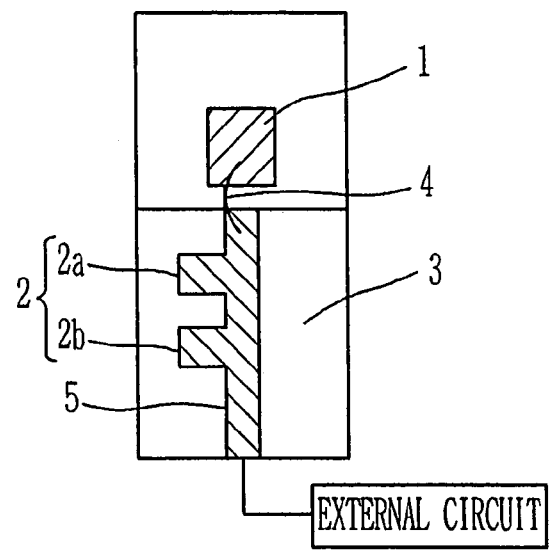
FIG. 1 is a schematic plan view illustrating an optical module having an impedance matching structure for a conventional lumped type optical device.
Figure 2:
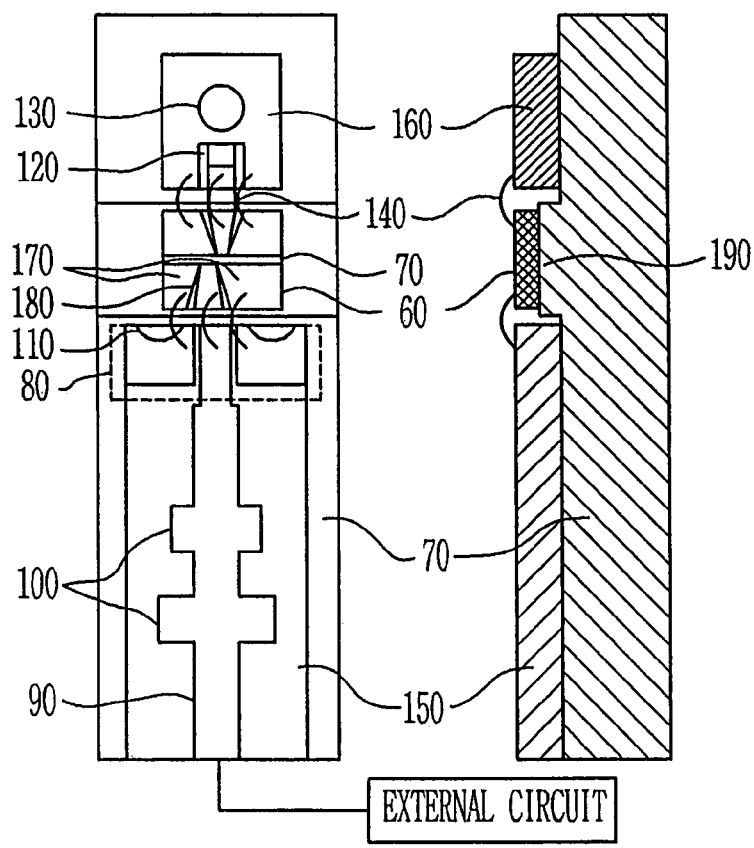
FIG. 2 is a schematic plan view and a cross-sectional view illustrating an optical module in accordance with an exemplary embodiment of the present invention.

FIG. 2 is a schematic plan view and a cross-sectional view illustrating an optical module in accordance with an exemplary embodiment of the present invention.

As illustrated in FIG. 2, the optical module includes a microstrip line 90, a traveling wave type optical device 60 positioned at the end of the microstrip line 90, and at least one stub 100 coupled to the microstrip line 90. A transition region 80 is formed between the optical device 60 and the microstrip line 90, and a termination resistance 120 is formed to face the microstrip line 90 with the optical device 60 therebetween.

In more detail, the optical module includes a base substrate 190 having a protruding part, first and second dielectric substrates 150 and 160, the optical device 60 disposed on the protruding part of the base substrate 190, and a thermoelectric cooler (TEC; not shown) disposed at the lower portion of the base substrate 190. The aforementioned elements are packaged in a module housing (not shown). Preferably, the optical device 60 is an optical modulator, a laser diode or a photodiode.

The base substrate 190 has electric conductivity. A hexahedral protruding part is formed on the base substrate 190. The microstrip line 90, the transition region 80 between the microstrip line 90 and a grounded coplanar waveguide, the open stub 100 are disposed on the first dielectric substrate 150.

The traveling wave type optical device 60 includes ground 170—signal line 180—ground 170 electrodes on a semi-insulating substrate. The first dielectric substrate 150 having an impedance matching circuit and the second dielectric substrate 160 having the termination resistor 120 are mounted at both sides of the device 60. The transition structure 80 between the grounded coplanar waveguide and the microstrip line 90 is formed on the first dielectric substrate 150 on which the impedance matching circuit is disposed. The transition structure 80 serves to transfer an RF between the microstrip line 90 and the coplanar waveguide without loss. The transition structure is required because of the structure difference of the device 60 and the microstrip line 90.

Since a half via 110 is formed on the ground surface for the grounded coplanar waveguide, the ground on the top surface of the first dielectric substrate 150 is electrically connected to the ground on the bottom surface thereof. Instead of using the half via 110, the top surface ground can be connected to the bottom surface ground through the side surface of the first dielectric substrate 150. Considering that a pitch of the ground 170—signal line 180—ground 170 of the device 60 is small, the signal line of the microstrip line 90 is preferably narrowed in the transition region 80.

The impedance matching circuit is formed on the first dielectric substrate 150. The matching circuit includes the balanced open stub 100, and is aligned in the orthogonal direction to the RF proceeding direction. The open stub 100 is preferably formed in a rectangular flat plate shape and connected to the microstrip line 90 to cross the microstrip line 90 at the right angle. The open stub 100 is formed on the first dielectric substrate 150. Preferably, the open stub 100 and the microstrip line 90 connected to the open stub 100 compose the matching circuit. The number of the open stubs 100 can be varied according to the semiconductor structure of the optical device 60. Preferably, two or more balanced open stubs 100 are formed in parallel to each other. A bandwidth of a predetermined frequency can be controlled by adjusting the number of the stubs 100. Preferably, the open stub 100 is formed to cross the microstrip line 90 at the right angle. Also, the open stub 100 can be protruded from one side surface of the microstrip line 90.

In this embodiment, the balanced open stub is used as the stub 100. The advantage of the balanced open stub 100 is to restrict interactions reaction between the microstrip line 90 formed in parallel to the RF proceeding direction and the stub 100. The stub 100 matches the impedance in a target frequency with an external circuit such as a driver or amplifier, thereby transmitting signals without loss.

On the other hand, in design of the stub 100, a length of the stub 100 may be restricted. Since a width of a dielectric substance is restricted to align the device 60 with an optical fiber, the length of the stub 100 is inevitably limited for the impedance matching. In this case, the end of the stub 100 has orthogonal transition in parallel to the RF proceeding direction to increase the length of the stub 100. Preferably, the some part of the orthogonal transition is removed to reduce a increased capacitance because of the increased area.

The structure of ground—signal line—ground is formed on the second dielectric substrate 160 having the termination resistor 120 in the same pitch as that of the device 60. The grounds are incorporated. The ground on the top surface of the dielectric substance 160 is electrically connected to the ground on the bottom surface thereof through a via 130. The termination resistor 120 (preferably, the thin film resistance) is formed between the signal line and the ground. The resistance value can be 30Ω, 50Ω, 100Ω, 500Ω or a specific impedance of the device 60.

A bandwidth of a target frequency can be controlled by adjusting the value of the termination resistor 120. The device 60 and the dielectric substrates 150 and 160 can be interconnected through a gold wire or gold ribbon 140. When the value of the termination resistor 120 is open, the gold thread is not connected between the signal lines of the device 60 and the termination resistor 120.

Since the device 60 and the first and second dielectric substrates 150 and 160 have different heights, the device 60 and the first and second dielectric substrates 150 and 160 are mounted on the base substrate 190 having irregular parts by using a conductive epoxy or solder. Since an inductance related with the gold wire 140 for electrically connecting the device 60 to patterns of the first and second dielectric substrates 150 and 160 is minimized by minimizing the length of the gold wire 140, the height of the device 60 and the substrates 105 and 160 should be same. Preferably, the base substrate 190 is made of CuW having high thermal conductivity, for efficiently dissipating heat generated in the device 60.

On the other hand, in order to precisely match the impedance, after the module is fabricated, the return loss is measured by a network analyzer, both ends of the open stub 100 are evenly trimmed by a trimming process, and the return loss is re-measured. This procedure is repeated until a maximum return loss is obtained in a target frequency, which results in precise impedance matching.

Figure 3A:
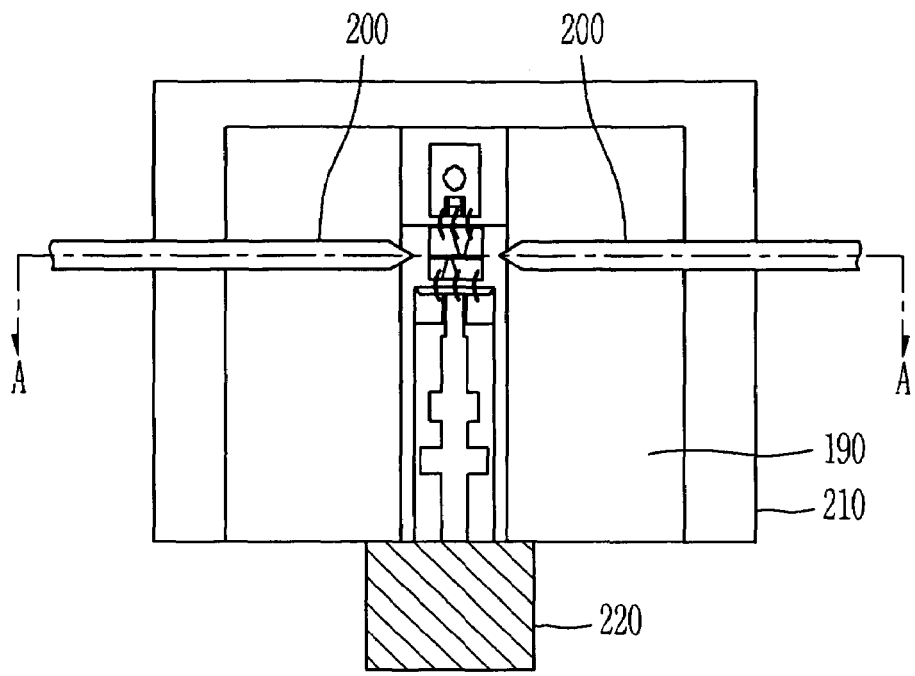
FIG. 3A is a schematic plan view illustrating an optical module formed by installing an optical device impedance-matched in FIG. 2 in a module housing and coupling the optical device to an optical fiber.

FIG. 3A is a schematic plan view illustrating the optical module formed by installing the optical device impedance-matched in FIG. 2 in the module housing and coupling the optical device to the optical fiber.

As depicted in FIG. 3A, continuous wave (unmodulated) light is transmitted to the device 60 from a lensed fiber 200, modulated, and transmitted to an opposite side lensed fiber 200. Here, lenses can replace the lensed fibers 200 to perform the same function. The fibers 200, the device 60, the dielectric substrates 150 and 160 and the base substrate 190 are mounted in the module housing 210. The module housing 210 includes a connector 220 for RF signal transmission. The RF signals from an external circuit are transmitted to the traveling wave type device 60 through the connector 220 and the impedance matching circuit.

When a too long stub 100 is designed for impedance matching, the width of the dielectric substance may not be sufficiently wide enough. In this case, when the optical device 60 is an optical modulator, the width of the dielectric substrates 150 and 160 is increased by increasing the size of the device 60 in the light proceeding direction by changing the design of the optical waveguide 70 in the light proceeding direction, thereby designing necessary stubs 100. That is, because the optical waveguide 70 of the optical modulator includes a passive waveguide, an active waveguide and a passive waveguide, the length of the passive waveguide or active waveguide can be appropriately increased.

Figure 3B:
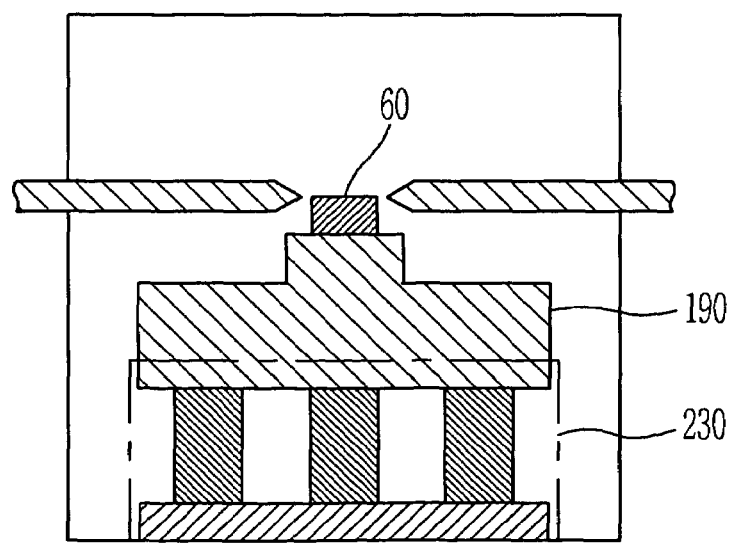
FIG. 3B is a schematic cross-sectional view illustrating the optical module of FIG. 3A, taken along line A-A.

FIG. 3B is a schematic cross-sectional view illustrating the optical module of FIG. 3A, taken along line A-A.

Referring to FIG. 3B, the base substrate 190 is formed under the traveling wave type optical device 60, and the TEC 230 for maintaining a constant temperature is formed under the base substrate 190.

Figure 4:
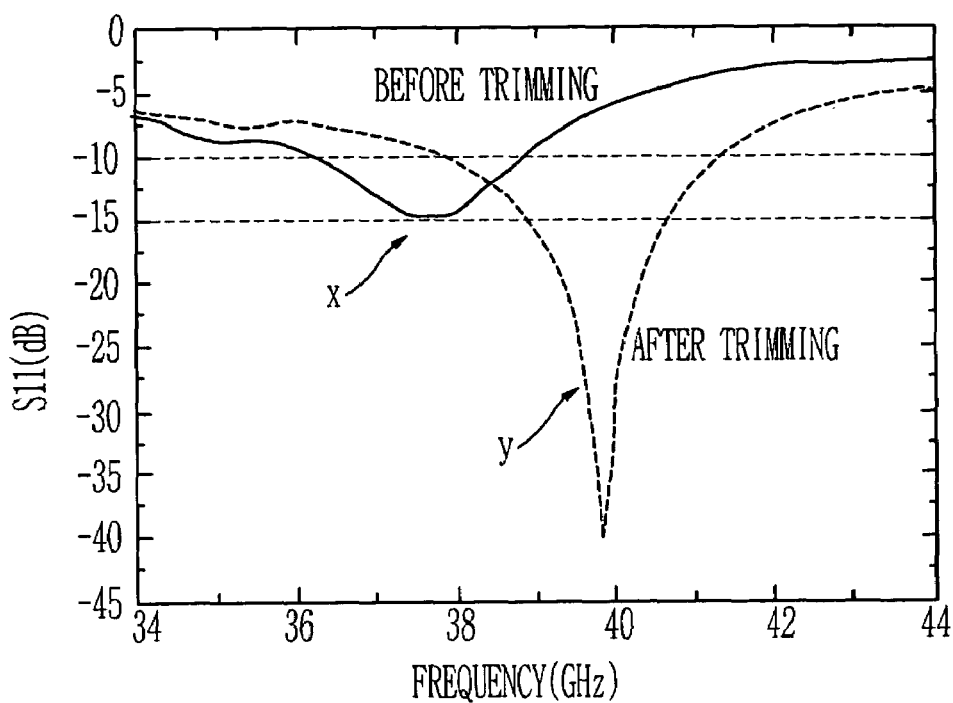
FIG. 4 is a graph showing a return loss before and after performing a trimming process in the optical module of FIG. 2.

FIG. 4 is a graph showing the return loss before and after performing the trimming process in the optical module of FIG. 2.

As shown in FIG. 4, a target frequency is about 40 GHz. In 40 GHz, the return loss is about 5 dB before the trimming process (x) and about 40 dB after the trimming process (y).

The vertical axis indicates the return loss property (dB) known as S11 parameter, and the horizontal axis indicates the frequency (GHz). For better understating, the return loss is expressed from 0 and the vertical axis is expressed in a negative direction.

On the other hand, the return loss is represented by the following equation.

$$\text{Return loss(dB)} = -10 \log_{10}(P_2/P_1) \quad \text{[Equation 1]}$$

Here, under the condition presuming that an RF signal is input from the side surface of the microstrip line 90, the power $P_1$ is an input from an input terminal (not shown) and the return power $P_2$ is reflective power returning to the input terminal.

Figure 5:
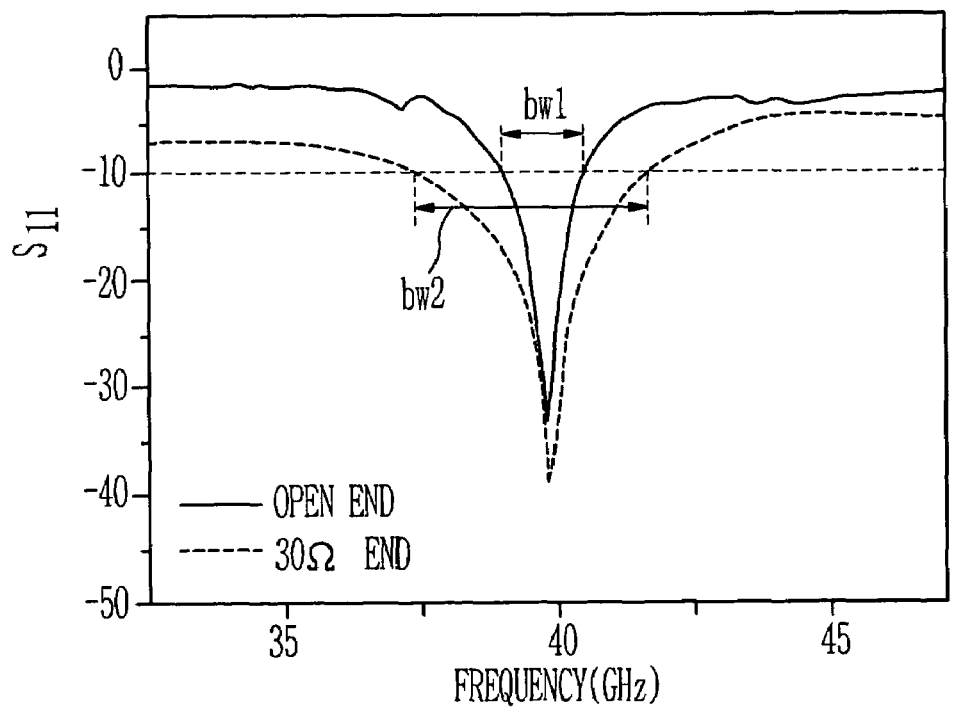
FIG. 5 is a graph showing bandwidth variations by termination resistance value variations as the return loss in the optical module of FIG. 2.

FIG. 5 is a graph showing bandwidth variations with termination resistor value in the measured return loss in the optical module of FIG. 2.

As illustrated in FIG. 5, traveling wave type optical devices with the same properties are mounted on modules whose termination resistance value is open and 30Ω, respectively, and the return loss is maximized in the target frequency by the trimming process described above. As a result, the bandwidth bw2 of the module whose termination resistor value is 30Ω is at least twice as large as the bandwidth bw1 of the module whose termination resistor value is open.

Therefore, when the ROF link needs to transmit wide bandwidth to subscribers, the bandwidth can be increased by adjusting the termination resistance value.

As discussed earlier, in accordance with the present invention, the impedance matching and optical module structure for the traveling wave type optical device matches the impedance between the traveling wave type optical device and the external circuit for driving the optical device. When it is necessary to control the bandwidth in the target frequency, the bandwidth can be controlled by adjusting the termination resistance value.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An optical module comprising:
   a microstrip line;
   a traveling wave type optical device positioned in the end of the microstrip line; and
   at least one stub connected to the microstrip line,
   wherein a transition region including the microstrip line and a grounded coplanar waveguide is formed to interconnect the optical device, and a termination resistor is formed to face the microstrip line with the optical device therebetween.

2. The optical module according to claim 1, wherein the stub crosses the microstrip line in the orthogonal direction, and is protruded from at least one surface of the microstrip line.

3. The optical module according to claim 1, wherein, when two or more stubs exist, the stubs are formed in parallel.

4. The optical module according to claim 1, wherein the stub is a balanced open stub.

5. The optical module according to claim 1, wherein the optical device is an optical modulator, a laser diode or a photodiode, and the optical modulator has a waveguide structure in which a passive optical waveguide, an active optical waveguide and a passive optical waveguide are sequentially formed.

6. The optical module according to claim 1, wherein the width of the microstrip line decreases in the transition region.

7. The optical module according to claim 1, wherein a orthogonal transition structure is formed at both ends of the stub in parallel to the proceeding direction of a radio frequency proceeding through the microstrip line, and at least partial area of the orthogonal transition structure is trimmed.

8. The optical module according to claim 4, wherein an impedance matching circuit including the balanced open stub is interconnected to the optical device through the transition region.

9. The optical module according to claim 8, wherein the optical device is interconnected to the transition region and the impedance matching circuit through a gold wire or ribbon.

10. The optical module according to claim 1, wherein a bandwidth of a predetermined frequency is controlled by adjusting a resistance value of the termination resistor.

11. The optical module according to claim 1, wherein a bandwidth of a predetermined frequency is controlled by adjusting the number of the stubs.

12. The optical module according to claim 1, wherein the grounded coplanar waveguide is electrically connected to ground by a formed via.

* * * * *